March 14, 1939. D. H. WEST 2,150,593
VERTICAL TAPERED SPLINE BROACHING MACHINE
Filed July 9, 1936 5 Sheets-Sheet 2
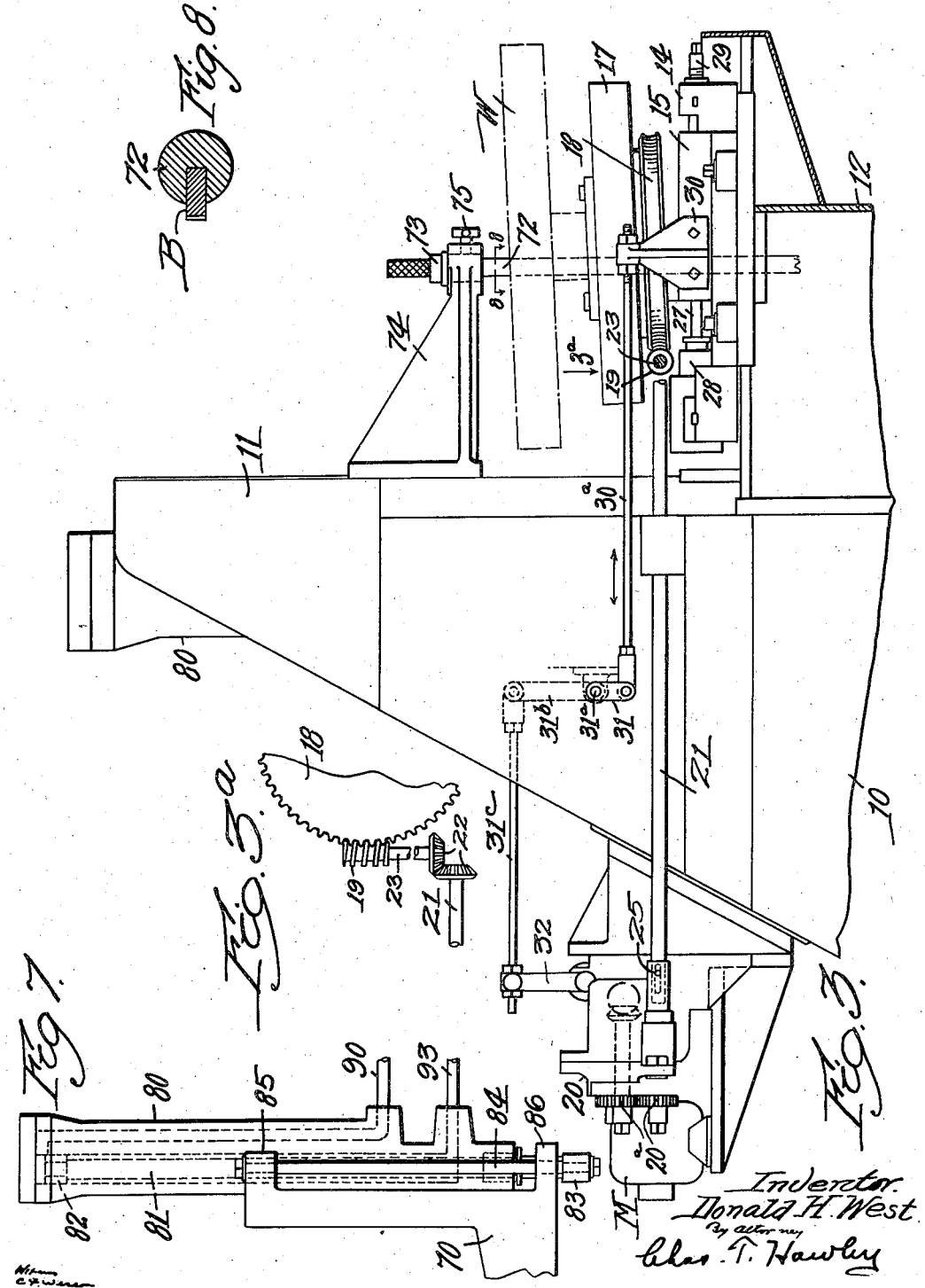

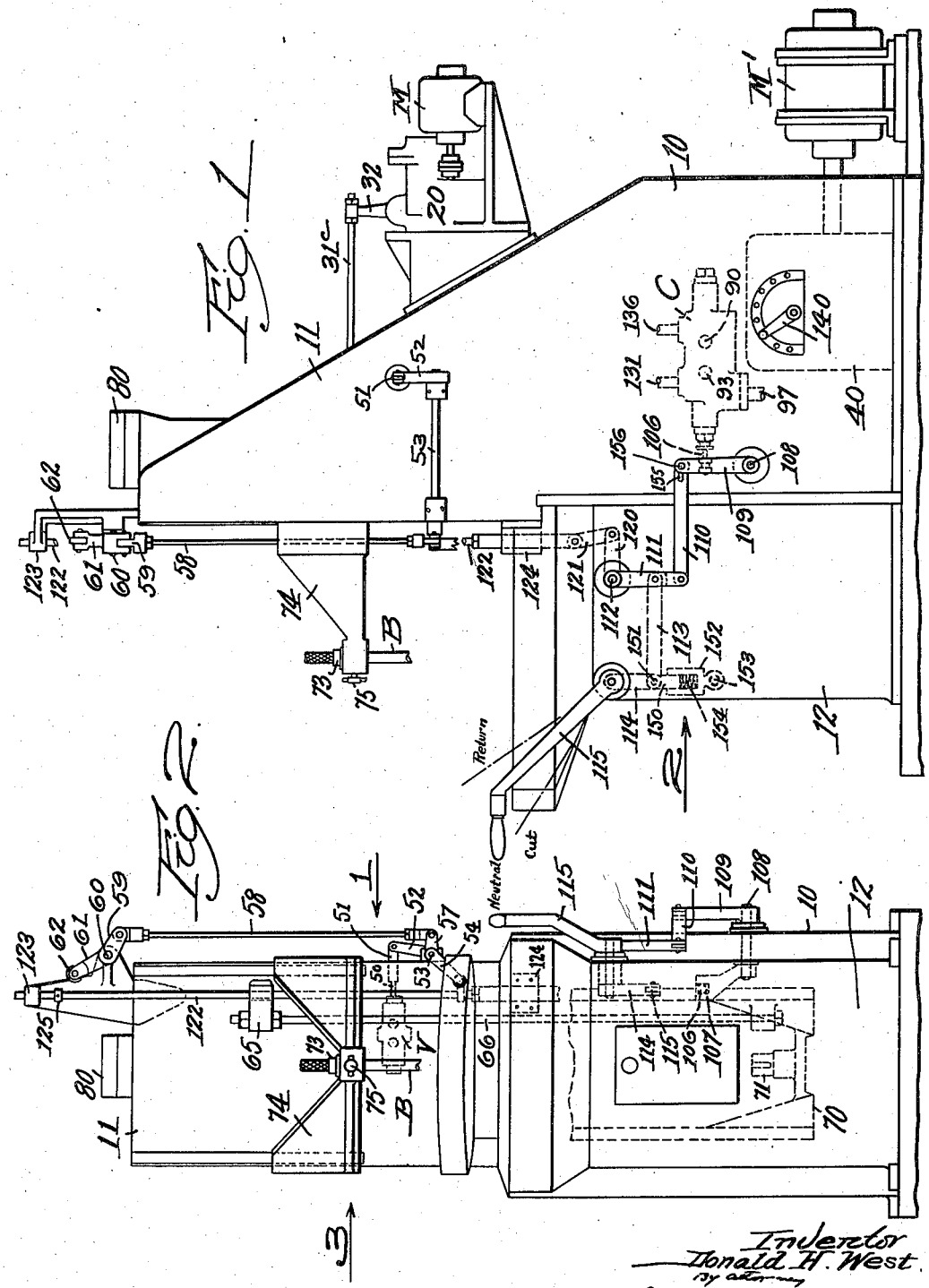

March 14, 1939. D. H. WEST 2,150,593
VERTICAL TAPERED SPLINE BROACHING MACHINE
Filed July 9, 1936 5 Sheets-Sheet 3
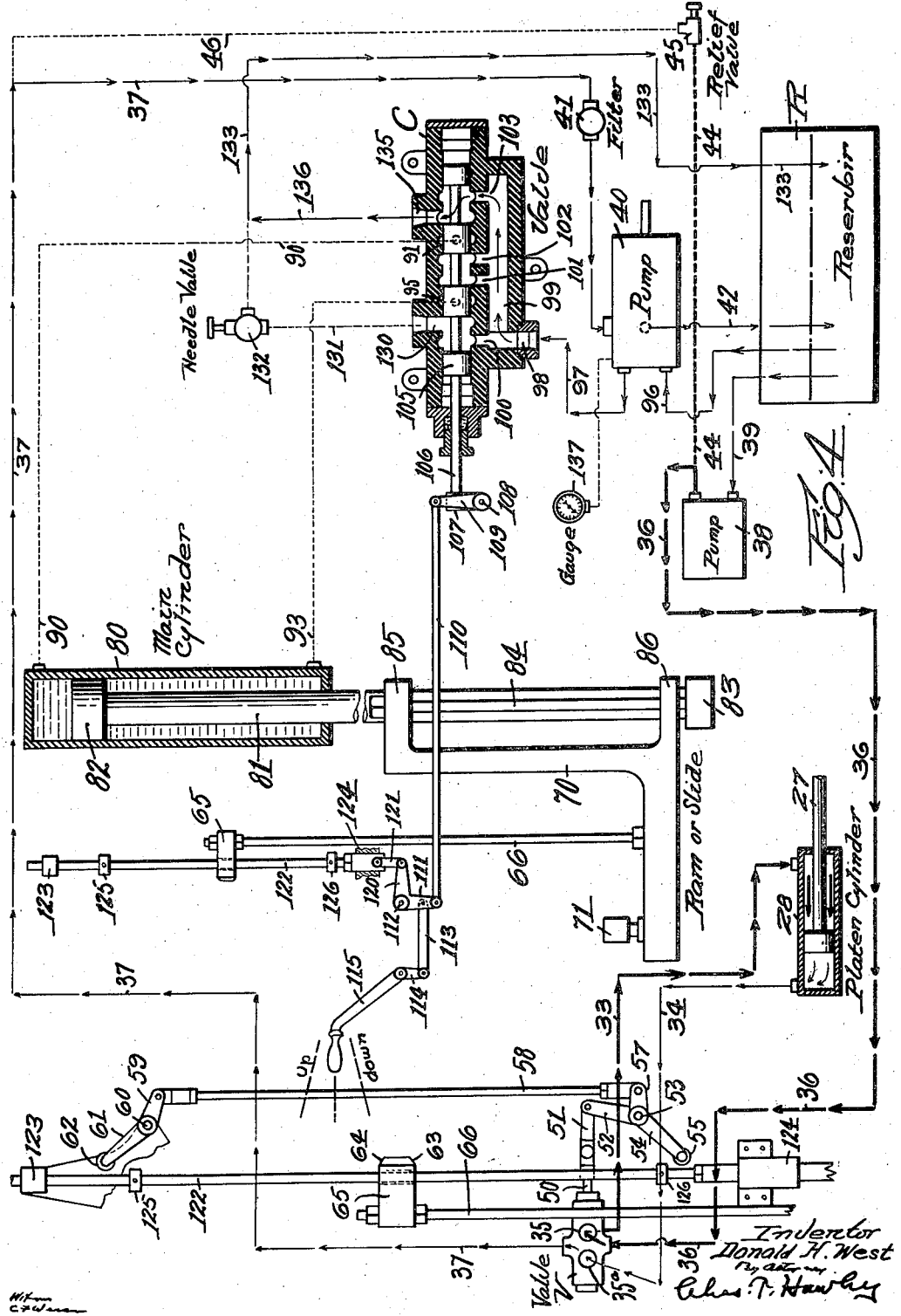

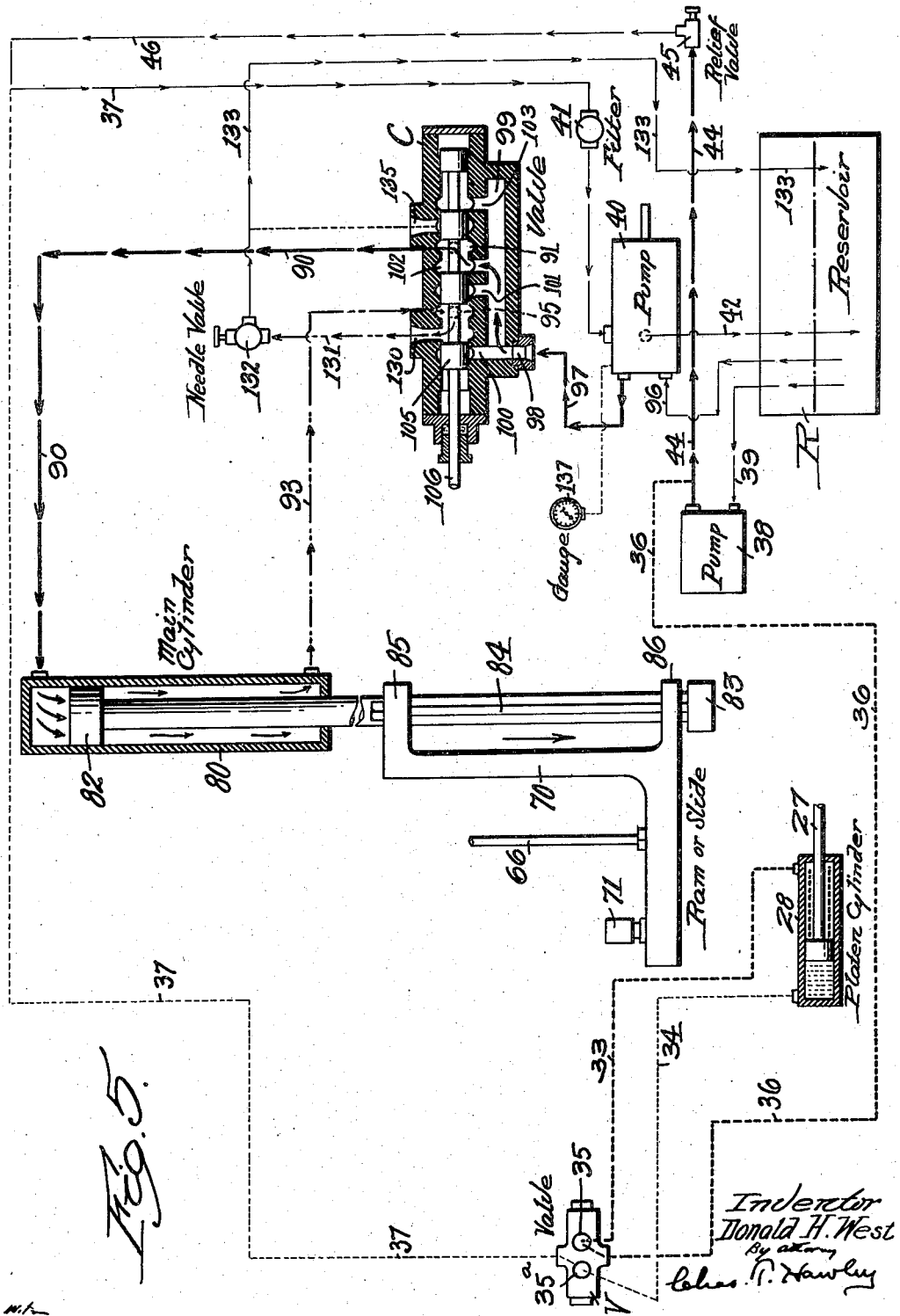

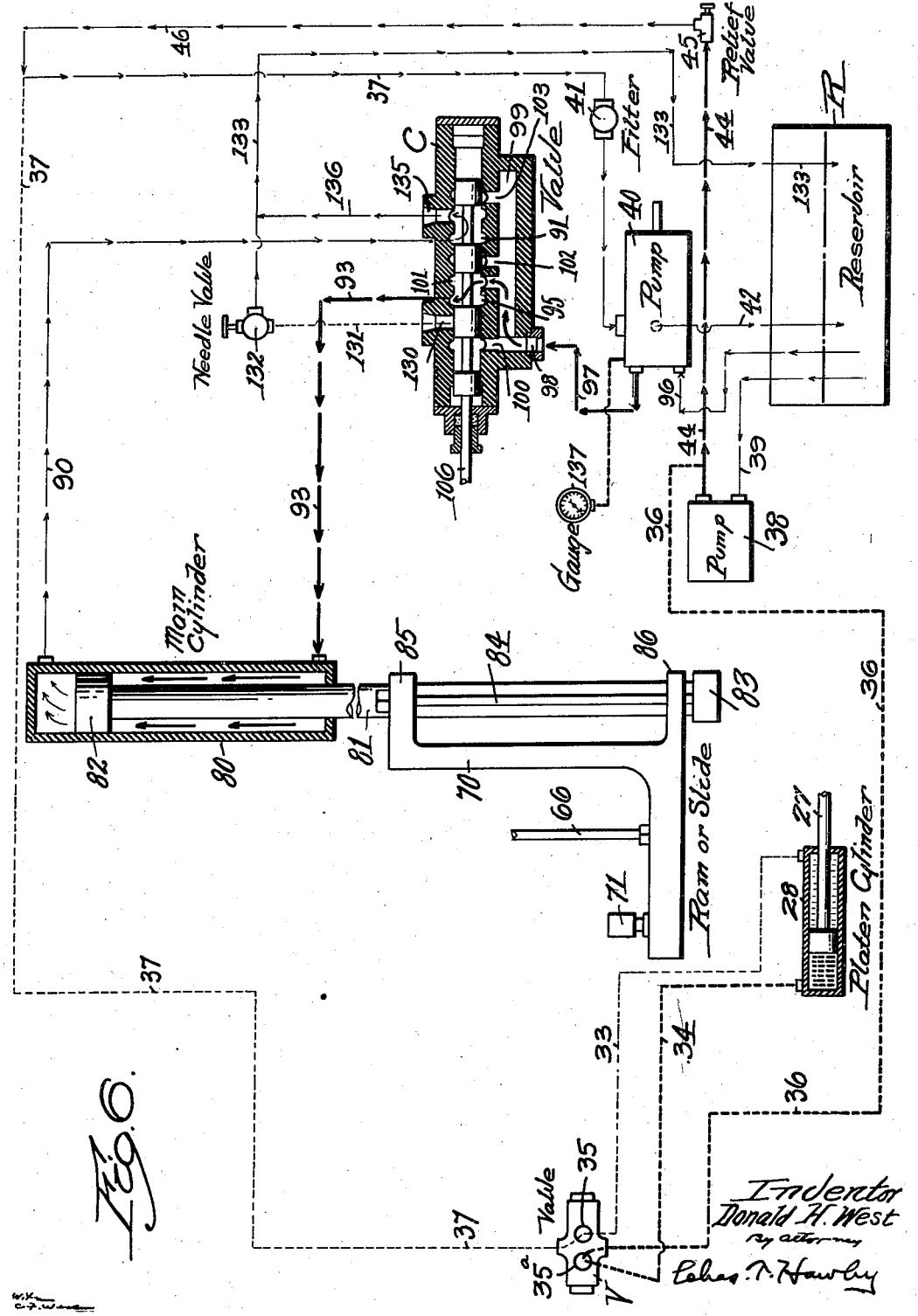

Patented Mar. 14, 1939

2,150,593

UNITED STATES PATENT OFFICE 2,150,593

VERTICAL TAPERED SPLINE BROACHING MACHINE

Donald H. West, Bolton, Mass., assignor to The Lapointe Machine Tool Company, Hudson, Mass., a corporation of Maine Application July 9, 1936, Serial No. 89,730

4 Claims. (Cl. 90—33)

This invention relates to a broaching machine of the vertical type and particularly to a machine adapted for cutting a plurality of splines or keyways in a tapered hole. It is apparent that a multiple broach cannot be used for such work on account of the generally conical disposition of the splines or keyways.

It is the general object of my invention to provide a machine in which the splines are cut separately and successively by a single broaching cutter and in which the work is indexed between successive cuts.

A further object is to provide a machine in which the work and broach are relatively separated during the idle return stroke of the broach, preferably by moving the work away from the broach. This latter arrangement permits the broach to be held in working position and without removal until the entire series of tapered splines or keyways has been cut.

I have shown my invention embodied in a hydraulically operated machine, and important features of my invention relate to special constructions and arrangements by which hydraulic operation is facilitated.

My invention further relates to arrangements and combinations of parts which will be hereinafter described and more particularly pointed out in the appended claims.

A preferred form of the invention is shown in the drawings, in which

Fig. 1 is a side elevation of my improved broaching machine;

Fig. 2 is a front elevation thereof;

Fig. 3 is a partial side elevation on an enlarged scale;

Fig. 3ª is a detail plan view, looking in the direction of the arrow 3ª in Fig. 3;

Figs. 4, 5 and 6 are diagrammatic views illustrating successive steps in the operation of my improved machine;

Fig. 7 is a partial side elevation of certain parts to be described; and

Fig. 8 is a detail sectional view on the line 8—8 in Fig. 3.

Referring to Figs. 1 to 3, my improved machine comprises a base or frame 10 having an upper portion 11 forming a post or column and having a front portion 12 forming a support for a guide member 14 (Fig. 3). A platen 15 is slidable in the guide member 14 and supports a work table 17 which is commonly mounted to rotate about an axis on the platen 15 which is selectively inclined with respect to the vertical, so that the tapered spline or keyway while being cut will be vertically positioned.

Any suitable mechanism for indexing the work table 17 and the work W may be provided. As shown in the drawings, the table 17 is associated with a worm gear 18 (Fig. 3) which is engaged by a worm 19 (Fig. 3ª) intermittently rotated by an index mechanism 20 through a drive shaft 21, bevel gears 22 and worm shaft 23.

The table 17 and worm gear 18 are mounted to rock about the axis of the worm shaft 23 when the table is moved to a selected inclined position, and the pin-and-slot connection indicated at 25 (Fig. 3) permits limited sliding movement of the platen 15 and work table 17 toward or away from the index mechanism 20, as will be hereinafter described. A separate motor M may be provided for the index mechanism.

The sliding movement of the platen is effected by a piston rod 27 (Fig. 3) connected to a piston in a hydraulic cylinder 28 mounted in fixed position on the support 12. A stop screw 29 limits outward sliding movement of the platen toward the broach, and similar provision may be made for adjustably limiting sliding movement in the opposite direction or away from the broach.

A bracket 30 (Fig. 3) is mounted on the platen 15 and a rod 30ª carried by the bracket is connected through an arm 31, rock shaft 31ª, arm 31ᵇ and link 31ᶜ to a lever 32 through which the index mechanism 20 is controlled.

The mechanism 20 is or may be of a usual commercial type and in itself forms no part of my present invention. For the purposes of this application it is sufficient to state that when the platen 15 is shifted to the left in Fig. 3 to move the work away from the broach, the lever 32 is moved in a clockwise direction to start the index mechanism in operation.

The index mechanism then operates through a predetermined cycle to angularly advance the work W from one keyway to the next. Change gears 20ª in the index mechanism 20 may be selectively combined to secure the angular advance of the work at each feeding movement which is required for a particular work item.

The cylinder 28 for shifting the platen 15 is connected by pipes 33 and 34 (Fig. 4) to ports 35 and 35ª in a work control valve V, which valve V is also provided with additional ports connected to a supply pipe 36 and to a discharge or return pipe 37. The supply pipe 36 is connected to a small pump 38 which has its intake pipe 39 extending into a tank or reservoir R.

The discharge pipe 37 is connected to the casing of a second pump 40 through a filter 41, and the casing is provided with an outlet pipe 42 discharging into the reservoir R. The passing of oil from the pump 38 through the casing of the larger pump 40 is useful in effectively lubricating the latter pump and in absorbing excess heat.

The pressure or delivery pipe 36 of the pump 38 is also connected through a pipe 44, relief valve 45 and pipe 46 to the discharge or return pipe 37 from the valve V. The purpose of this latter connection will be hereinafter described.

The valve rod 50 (Fig. 4) of the reversing valve V is connected by a link 51 to an arm 52 on a rock shaft 53. The rock shaft 53 is provided with an arm 54 having a cam roll 55 mounted thereon, and the shaft 53 also has an arm 57 connected by a link 58 to an arm 59 on an upper rock shaft 60.

The shaft 60 is provided with an arm 61 and cam roll 62 corresponding to the parts 54 and 55 previously described.

The rolls 55 and 62 are positioned for engagement by lower and upper cam surfaces 63 and 64 on a block 65 fixed on a vertically slidable rod 66. The connections are such that when the lower roll 55 is engaged by the cam surface 63, the valve rod 50 will be shifted to the left and the upper roll 62 will be advanced into the path of the upper cam surface 64. When the rod 66 thereafter moves upward, the arm 61 will be swung outward and the valve rod 51 will be shifted to the right to reverse the hydraulic connections of the work control valve V.

The rod 66 is secured to the lower part of the ram or slide 70 which actuates the pull broach B. The broach is secured at its lower end in a pull socket or holder 71 and is slidable in a broach guide 72 (Figs. 3 and 8), the upper end of which extends through a bushing 73 on a bracket 74 fixed to the post or column 11.

The lower end of the broach guide 72 is seated in a recess or socket fixed in position below the work W and the platen 15. The broach guide 72 is secured in working position by a clamping screw 75 on the bracket 74. When it is desired to change the work, the screw 75 is loosened and the broach guide 72 is pulled upward through the bushing 73. The work can then be removed and replaced, the broach B being in its extreme downward position.

In order to reduce the over-all height of the machine, the ram or slide 70 is constructed to slide in guideways at each side of the main cylinder 80. It is desirable, however, that the power be applied to the uppermost part of the ram, and for this reason the piston rod 81 which is actuated by the piston 82 in the cylinder 80 is connected to a cross head 83 (Fig. 7) which is below and entirely separate from the ram 70. Rods 84 extend upward from the cross head 83 to offset portions 85 at the upper end of the ram 70 and are firmly secured to said portions 85. These rods also extend loosely through lower offset portions 86 but have no operative connection therewith.

It will be understood that the portions 85 and 86 are spaced at each side of the cylinder 80, so that as the ram is moved upward, the portions 85 and 86 and the rods 84 will clear the cylinder 80 and thus permit substantial telescoping of the parts, with corresponding reduction in over-all height.

The main cylinder 80 is connected at its upper end by a pipe 90 to a port 91 in a control valve device C. The lower end of the main cylinder 80 is similarly connected by a pipe 93 to a port 95 in the valve C. The pump 40 previously described is provided with an intake pipe 96 from the reservoir R and with a pressure or supply pipe 97 connecting the pump to an opening 98 in the valve C which communicates with a passage 99 and port 100. The passage 99 communicates with additional ports 101, 102 and 103.

A four-part piston valve 105 (Fig. 4) has its piston rod 106 connected through an arm 107, rock shaft 108, arm 109 to a link 110. The link 110 is connected to an arm 111 on a rock shaft 112 and the shaft 112 is connected by a link 113 and an arm 114 to a handle 115.

The rock shaft 12 is also connected by an arm 120 and link 121 to a rod 122 vertically slidable in fixed bearings 123 and 124 and provided with upper and lower collars 125 and 126 respectively.

The rod 122 extends loosely through a vertical opening in the block 65 and the collars 125 and 126 are engaged alternately by the upper and lower surfaces of the block 65 as the rod 66 and block 65 are moved vertically with the ram 70 and broach B and approach their upper or lower limits of travel.

The control valve C is provided with an additional port 130 connected through a pipe 131 and needle valve 132 to the pipe 133 which discharges into the reservoir R. A port 135 in the valve C is connected by a pipe 136 to the pipe 133 previously described.

The pump 40 is preferably of the variable discharge type and may be actuated by a constant speed motor M'. The discharge of the pump may be selectively adjusted manually by a control lever 140 (Fig. 1). The pump 40 is provided with the usual gauge 137, connected to show the pressure on the discharge side of the pump.

Having described the details of construction of my improved vertical broaching machine, I will first describe the general operation of the machine and will then describe in detail the operation of the hydraulic mechanism.

The work W having been secured on the rotating work table 17, the broach guide 72 is inserted downward through the bushing 73 (Fig. 3) and is secured by the clamping screw 75. The work table at this time has been shifted to the left and is out of contact with the broach.

The ram or slide 70 is then caused to move upward, after which the work is shifted to the right in Fig. 3. The broach is given an operative downward movement, cutting the first tapered spline or keyway in the internal wall of the opening in the hub of the work.

As the broach approaches its lower limit of travel, the lower cam surface 63 of the block 65 engages the lower roll 55, which in turn reverses the valve V which controls the platen cylinder 28. This reversal of the valve V causes the piston in the platen cylinder 28 to be moved to shift the work to the left, so that the broach is clear in the axial opening in the hub of the work. This shifting movement of the work away from the broach also acts through the connections described to start the index mechanism, which then advances the work angularly to the next broaching position while the broach is out of contact therewith.

As the downward travel of the broach is fully completed, the block 65 engages the collar 126 on the rod 122 and acts through the connections shown in Fig. 4 to shift the control valve C, thus reversing the travel of the piston 82 and causing the slide 70 and broach B to be moved upward to initial position.

The cycle of operations is then again repeated, the broach cutting a new keyway on each downward movement and the index mechanism advancing the work angularly after the completion of each cut and while the broach is out of contact with the work.

This cycle of operation is repeated automatically until the desired number of keyways has been cut in the work, and the machine may then be stopped, either manually or automatically, with the broach in down position. The broach guide 72 is then removed, the work W is replaced, and another series of broaching cuts will then take place.

In order to prevent the control valve C from stopping in neutral position when the machine is operating automatically, I provide a plunger 150 (Fig. 1) pivoted to the link 113 and arm 114 at 151 and slidable in a cylinder 152 mounted to swing on a fixed pivot 153. A spring 154 is housed in the cylinder 152 below the plunger 150. I also provide the link 110 with a slot 155 to receive a pin 156 in the upper end of the arm 109.

The pin and slot connection between the link 110 and the arm 109 allows the link 110 and connected parts to be moved a substantial distance in either direction before the pin 156 engages the end of the slot and communicates motion to the piston rod 106. Consequently when the block 65 engages one of the collars on the vertical rod 122 and moves the arms 120 and 111, links 110 and 113, and arm 114, these parts will be brought to mid-position before the control valve C is brought to mid or neutral position.

The hydraulic connections will thus still be effective to continue movement of the block 65 and associated parts until the toggle pin 151 is beyond the center line, after which the spring 154 will exert pressure to complete the movement of the valve. In this way the stalling of the machine on reversal is effectually avoided.

The handle 115 is used to start the machine in operation and may be used to stop the machine at any desired point in the series of broaching operations or when the work is completed.

The hydraulic mechanism herein described possesses special advantages in the operation of this particular type of broaching machine and the operation and advantages thereof will now be described.

The parts are shown in Fig. 4 with the control valve C in mid or neutral position and with the valve V in position to move the piston rod 27, together with the work table and work, to the left to clear the broach. Such movement also renders the index mechanism operative.

The heavy lines in the diagram indicate flow of oil under pressure, the light lines indicate flow of exhaust or discharge oil from the cylinders, and the dotted lines indicate connections in which no flow of oil is taking place.

Referring to Fig. 4, oil under pressure is conducted from the pump 38 through the pipe 36 and port 35 to the pipe 33 which connects with the right-hand end of the platen cylinder 28. The left-hand or exhaust end of the cylinder 28 is connected through the pipe 34 and port 35a to the exhaust connection 37. Oil flowing through this exhaust connection is filtered at 41 and is then passed through the casing of the main pump 40 in its return travel to the reservoir R. The oil discharged from the platen cylinder 28 thus performs a cooling function in the pump 40.

Flow of oil from the pump 38 will continue as described until the platen reaches its limit of movement, after which the pump 38 will discharge through the pipe 44, relief valve 45 and by-pass connection 46 into the return line 37 previously described.

As the control valve C is in mid-position, the discharge of the main pump 40 is by-passed through the pipe 97, port 98, passage 99, port 103, port 135, pipe 136 and pipe 133 back to the reservoir R. At the same time the ports 91 and 95 are closed in the valve C, so that no flow of oil can take place either toward or away from either end of the main cylinder 80 and consequently the ram or slide 70 is locked in fixed vertical position. This is a valuable safety feature, as it makes downward movement of the ram impossible when the machine is not in operation.

The position of the parts during the working or downward stroke of the ram 70 is indicated in Fig. 5. The pump 38 continues to discharge through the pipe 44, relief valve 45 and by-pass 46 to the return line 37 as previously described. The piston valve in the control valve mechanism C has been shifted to the right, so that oil under pressure in the passage 99 is now conducted through the ports 102 and 91 to the pipe 90 which is connected to the upper end of the main cylinder 80.

The discharge from the lower end of the cylinder is conducted through the ports 95 and 130 to the pipe 131, which is connected through the needle valve 132 to the pipe 133 which discharges into the reservoir R. The needle valve 132 may be set manually to maintain any desired back pressure under the piston 82 in the main cylinder 80.

The position of the parts during the return stroke is indicated in Fig. 6, the valve in the control mechanism C having been shifted to the left. The pump 38 continues to discharge through the relief valve 45 as previously described. The main pump 40 now delivers oil from the passage 99 through the ports 101 and 95 to the pipe 93 which is connected to the lower end of the cylinder 80.

The upper end of the cylinder 80 is connected through the pipe 90, port 91, port 135 and pipe 136 to the return pipe 133 which discharges into the reservoir R.

It will be noted that during the upward movement of the ram or slide 70, the discharge is by-passed around the needle valve 132, so that back pressure is maintained only during the downward stroke. The same by-pass connection through the pipe 136 is also used during the idle operation of the pump 40 when the machine is in neutral position.

I have thus provided very simple hydraulic mechanism by which the broach may be operated at any desired speed and may be stopped and locked in any desired position and by which the work may be automatically indexed at the completion of each cut.

Having thus described my invention and the advantages thereof, I do not wish to be limited to the details herein disclosed, otherwise than as set forth in the claims, but what I claim is:—

1. In a broaching machine, a hydraulic cylinder, piston and piston rod, a work support, a ram, control means effective to cause said piston to move said piston rod downward on a working stroke and upward on a return stroke, a cross head separate from said ram and attached to said piston rod below said ram, and a pair of spaced pull rods positioned substantially in a plane with said piston connected between said cross head and points of attachment on the upper portion of said ram.

2. In a broaching machine, a hydraulic cylinder, piston and piston rod, a work support, a ram, control means effective to cause said piston to move said piston rod downward on a working stroke and upward on a return stroke, a cross head separate from said ram and attached to said piston rod below said ram, and pull rods connected between said cross head and points of attachment on upper spaced portions of said ram, said rods extending freely through openings in lower spaced portions of said ram but being free therefrom.

3. In a vertical broaching machine having a broach, an annular rotatable work support, means to reciprocate said broach along a fixed path within said annular work support and in an axial opening in the work, means to shift the work support to move the axis of the work away from the broach to clear the broach at the end of the cutting stroke and to return said work support to operative position at the end of the return stroke of said broach, and means to angularly index the work support and work, that improvement which consists in providing a direct control connection between said work support and said indexing means through which direct connection said indexing means is rendered operative to advance the work support and work angularly by movement of the work support away from broaching position.

4. In a broaching machine having hydraulic broach-operating mechanism, in combination, a control valve for said mechanism, a valve actuating member, automatic means to move said actuating member to shift said control valve to a reverse operating position at each end of the broach travel, spring toggle means to complete the movement of said actuating member in each direction, and a lost motion connection between said member and valve so constructed and arranged that said spring toggle means is given a lead on said valve when operated in either direction, whereby said valve remains in each operative position until said spring toggle means has been automatically shifted across dead center relative thereto.

DONALD H. WEST.